W. P. KEARNEY.
AXLE LUBRICATING DEVICE.
APPLICATION FILED AUG. 31, 1915.

1,243,946.

Patented Oct. 23, 1917.

Witnesses

Inventor
W. P. Kearney
By
Attorneys

UNITED STATES PATENT OFFICE.

WILLIAM P. KEARNEY, OF MONTREAL, QUEBEC, CANADA.

AXLE-LUBRICATING DEVICE.

1,243,946.                    Specification of Letters Patent.    Patented Oct. 23, 1917.

Application filed August 31, 1915.   Serial No. 48,196.

*To all whom it may concern:*

Be it known that I, WILLIAM P. KEARNEY, a subject of the King of Great Britain, and resident of the city of Montreal, in the Province of Quebec and Dominion of Canada, have invented certain new and useful Improvements in Axle-Lubricating Devices, of which the following is a full, clear, and exact description.

This invention relates to improvements in lubricating devices for vehicle axles, and the object is to provide a simple, inexpensive and efficient means for lubricating the axles of vehicles.

A further object is to provide means for retaining a large reserve store of lubricant, so that in the event of infrequent lubricating, the wheel will not run dry.

The device consists essentially of an axle having a longitudinal groove in the bearing portion thereof, communicating with an annular groove in the shoulder. A tube is provided in the bottom of the groove extending through to the end of the axle, through which lubricant may be supplied to both grooves.

In the drawings which illustrate the invention:—

Figure 1:
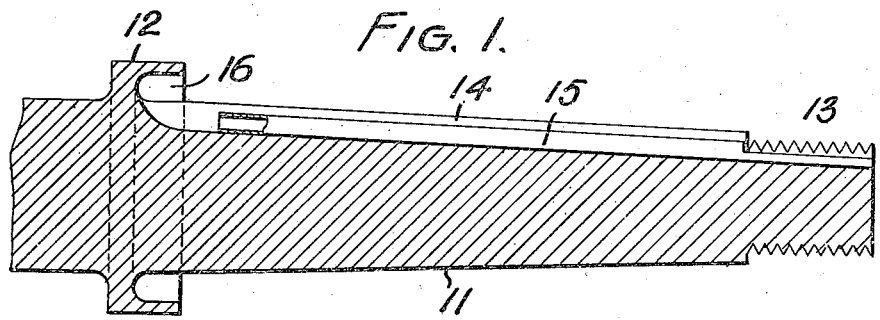
Figure 1 is a longitudinal sectional view of an axle showing the arrangement in its simplest form.

Referring more particularly to the drawings, 11 designates the bearing portion of an axle having at one end a shoulder 12 and at the opposite end a reduced portion 13, threaded for the reception of the usual wheel retaining nut. A groove 14 is formed longitudinally in the bearing portion of the axle extending from the shoulder through the threaded portion to the end of the axle, and adapted for the reception of a tube 15, extending from the end of the axle approximately to the shoulder. A second annular groove 16 is formed in the shoulder and communicates with the groove 14, as will be clearly seen in the drawings.

Figure 2:
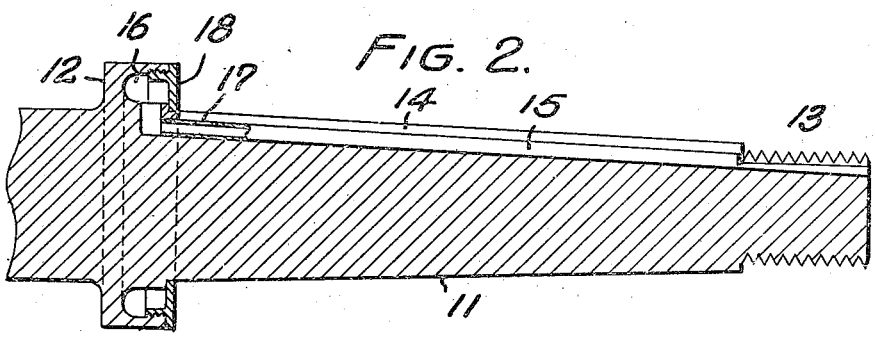
Fig. 2 is a similar view showing a slight modification.
Figure 3:
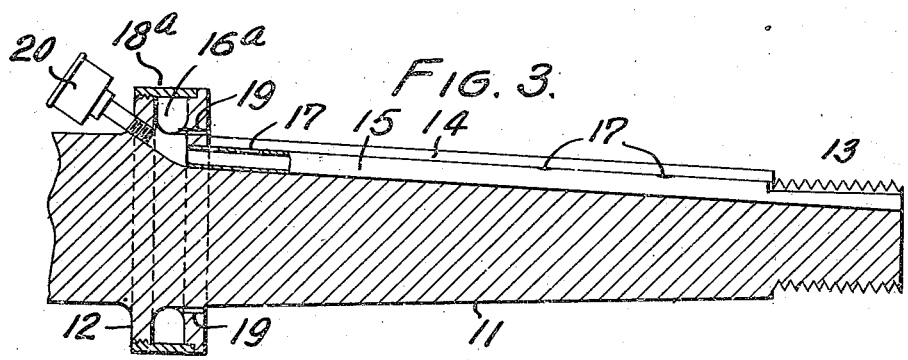
Fig. 3 is a further similar view showing additional modifications.

In Fig. 1, the tube 15 terminates close to the shoulder, while in Figs. 2 and 3, the tube extends slightly past the outer face of the shoulder, so as to communicate directly with the groove 16. In order to permit the entrance of lubricant from the tube to the groove 14, a suitable number of apertures 17 are provided in the tube adjacent the shoulder or otherwise, as desired. Such apertures also form with the portion of tube between them and the annular groove 16 a means of communication between the annular groove and the longitudinal groove. This is especially true in the arrangement shown in Fig. 2, where the groove 16 is completely isolated from the bearing portion by a ring 18 screw-threaded to the shoulder.

In Fig. 3, the groove, designated 16ª, is circumferential rather than annular, and is closed by a ring 18ª screw-threaded to the shoulder. The connection between the grooves 14 and 16ª is similar to that shown in Fig. 2, but in addition to the tube apertures 17, small apertures 19 are formed leading from the bottom of the groove 16ª to the bearing surface. In addition to this, the groove 16ª is provided with a separate filling plug, compression cup, or other suitable device, designated by the numeral 20, so that this groove may be filled independently of the groove 14, and without the necessity of forcing lubricant from the end of the axle through the tube 15.

The operation of the device is extremely simple, and will be very nearly obvious from the foregoing description. Lubricant is introduced to fill the tube 15 and groove 16 by means of a grease gun or the like, applied to the tube at the end of the axle. When thus filled, the groove 14 forms a channel conveying lubricant from end to end of the bearing surface, while the groove 16 form a reservoir from which the lubricant is drawn, as required by the wheel. Any lubricant, in excess of that actually required at the shoulder, which may be removed from the groove 16, will find its way into the groove 14 and be slowly conveyed toward the outer end of the axle, thus effectively lubricating the entire bearing surface for a long period of time, without the necessity of re-filling. In the other forms, the removal of lubricant from the reserve groove 16 is perhaps not so rapid, and these forms will therefore be better adapted for the thinner lubricants, while that shown in Fig. 1 would be more suitable for heavy grease. It will be understood that the invention is not limited to the precise arrangements shown, but that the details shown or mechanical equivalents of same may be used in any desired combination. It will be obvious that in the case of an axle which has no shoulder, the arrangement of circumferential groove shown in Fig. 3 may be applied equally well at one end of the bearing surface, also loose collars secured to the axle may be removed and replaced by new collars shrunk on and having grooves arranged as above described.

Having thus described my invention, what I claim is:—

1. An axle longitudinally grooved in its bearing surface, a shoulder on said axle having an annular groove concentric with the axle and in communication with the axle groove, and a tube in the bottom of the groove adapted to supply lubricant to both grooves simultaneously.

2. An axle longitudinally grooved in its bearing surface, a shoulder on said axle having an annular groove concentric with the axle, a tube in said groove, said shoulder having a main passage communicating with said tube and a supplemental passage communicating with said groove.

In witness whereof, I have hereunto set my hand, in the presence of two witnesses.

WILLIAM P. KEARNEY.

Witnesses:
S. R. W. ALLEN,
C. W. TAYLOR.